United States Patent
Pallardy et al.

(10) Patent No.: US 12,547,566 B2
(45) Date of Patent: Feb. 10, 2026

(54) CONNECTION CIRCUIT FOR MEMORY ACCESSES

(71) Applicant: STMicroelectronics International N.V., Geneva (CH)

(72) Inventors: Loic Pallardy, Rouillon (FR); Alexandre Torgue, Saint Saturnin (FR)

(73) Assignee: STMicroelectronics International N.V., Geneva (CH)

( * ) Notice: Subject to any disclaimer, the term of this patent is extended or adjusted under 35 U.S.C. 154(b) by 53 days.

(21) Appl. No.: 18/415,884

(22) Filed: Jan. 18, 2024

(65) Prior Publication Data

US 2024/0248864 A1    Jul. 25, 2024

(30) Foreign Application Priority Data

Jan. 20, 2023 (FR) ...................................... 2300540

(51) Int. Cl.
*G06F 13/28* (2006.01)
(52) U.S. Cl.
CPC ................................... *G06F 13/28* (2013.01)
(58) Field of Classification Search
CPC ....................................................... G06F 13/28
See application file for complete search history.

(56) References Cited

U.S. PATENT DOCUMENTS

| 5,313,610 A | 5/1994 | Oliver et al. |
| 5,623,697 A | 4/1997 | Bland et al. |
| 6,633,944 B1* | 10/2003 | Holm .................. G06F 13/4018 370/402 |
| 2007/0162648 A1* | 7/2007 | Tousek ................ G06F 13/1642 710/22 |
| 2011/0320758 A1 | 12/2011 | Craddock et al. |
| 2017/0315912 A1* | 11/2017 | Wright ................ G06F 12/0623 |

OTHER PUBLICATIONS

INPI Search Report and Written Opinion for priority application, FR Appl. No. 2300540, report dated Aug. 25, 2023, 9 pgs.

* cited by examiner

*Primary Examiner* — Tim T Vo
(74) *Attorney, Agent, or Firm* — Crowe & Dunlevy LLC

(57) ABSTRACT

A connection circuit couples a first circuit of a device to a bus configured to provide access to an addressable memory space of the device. The connection circuit receives an input address transmitted by the first circuit. The input address corresponds to an address in a first address range or a second address range of the addressable memory space. The addressable memory space further includes a third address range that is not addressable by the first circuit. The connection circuit compares the input address with a threshold address. In response to the comparison, the connection circuit generates a portion of an output address, the output address belonging to the second address range or the third address range of the addressable memory space. The portion of the output address is then supplied to the bus.

14 Claims, 4 Drawing Sheets

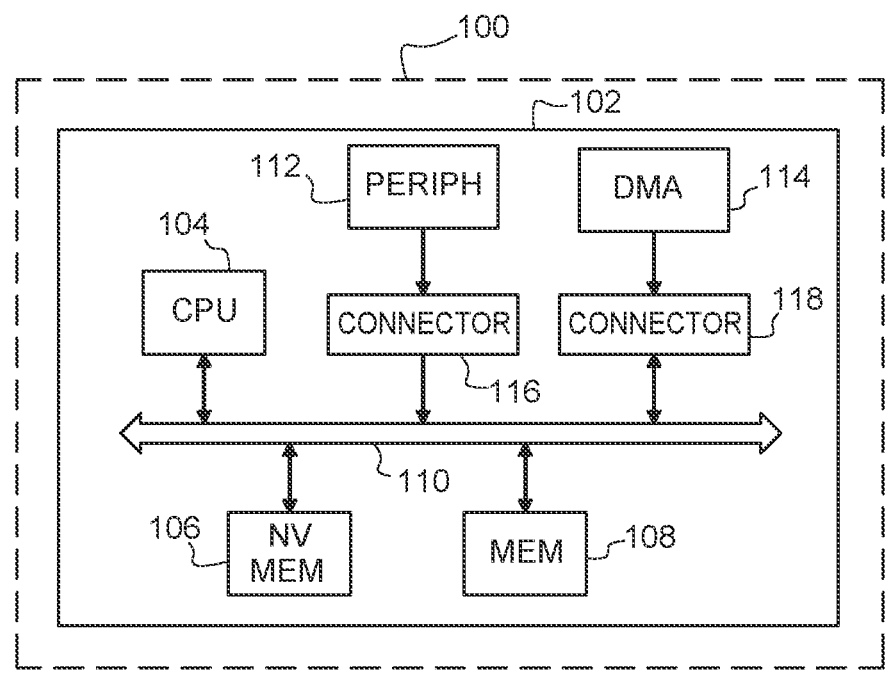
Fig. 1
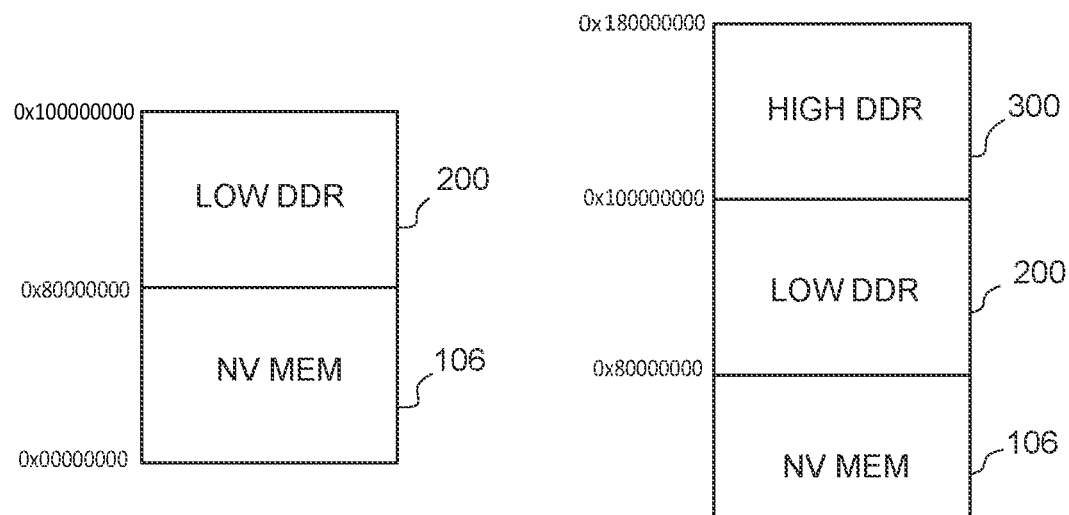
Fig. 2
Fig. 3

CONNECTION CIRCUIT FOR MEMORY ACCESSES

PRIORITY CLAIM

This application claims the priority benefit of French Application for Patent No. 2300540, filed on Jan. 20, 2023, the content of which is hereby incorporated by reference in its entirety to the maximum extent allowable by law.

TECHNICAL FIELD

The present disclosure generally concerns the access to a memory space by a circuit such as a peripheral circuit of the device or a direct memory access circuit.

BACKGROUND

Certain electronic devices comprise an addressable memory space having at least a portion which is not addressable by certain peripheral circuits.

Indeed, certain devices comprise, for example, 64-bit processors having access to a memory space of more than 4 Gigabytes. However, these devices may also comprise 32-bit peripherals or direct memory access circuits ("DMA Circuits"), which are limited and do not have the possibility of addressing the entire address range of the memory space.

There exists a need to make accessible to a peripheral circuit, and/or another circuit, address ranges which are not directly addressable by this circuit.

SUMMARY OF THE INVENTION

An embodiment provides a connection circuit coupling a first circuit of a device to a bus configured to provide access to an addressable memory space of the device, the connection circuit being configured to: receive an input address, transmitted by the first circuit, the input address corresponding to an address in a first address range or in a second address range of the addressable memory space, the addressable memory space further comprising a third address range, not addressable by the first circuit; compare the input address with a threshold address; based on the comparison, generate a portion of an output address, the output address belonging to the second address range or to the third address range of the addressable memory space; and supply the portion of the output address to the bus.

According to an embodiment, the portion of the output address comprises one or a plurality of additional address bits, and the connection circuit is configured to supply the bus with said one or a plurality of additional address bits as most significant bits of the output address.

According to an embodiment, the above circuit is further configured to: if the input address belongs to the second address range, generate one or a plurality of most significant bits of the output address at a first binary value (for example, binary value "0"); and if the input address belongs to the first address range, generate one or a plurality of most significant bits of the output address at a second binary value (for example, binary value "1").

An embodiment provides a device comprising: one or a plurality of memory circuit defining an addressable memory space comprising a first address range, a second address range, and a third address range; a first circuit which is not capable of generating an address forming part of the third address range; and a connection circuit coupling the first circuit to the addressable memory space.

According to an embodiment, the above device further comprises a processor, wherein the connection circuit further comprises a register, programmable by the processor, the register being configured to store a first bit having its value defining whether the circuit is in a first state or in a second state, the second state being a state where the connection circuit is deactivated.

According to an embodiment, the register is configured to store a second bit, programmable by the processor and having its programming locking the state of the connection circuit at the state defined by the value of the first bit.

According to an embodiment, the processor is a 64-bit processor and the first circuit is a 32-bit peripheral circuit.

According to an embodiment, the memory space comprising the second address range and third address range is implemented by a volatile memory, the third address range being addressable by the processor.

According to an embodiment, the first circuit is a peripheral circuit of the device.

According to an embodiment, the first circuit is a direct memory access circuit, the direct memory access circuit being configured to send, based on the content of a register, an activation signal to the connection circuit, the activation signal programming the connection circuit in the first state.

According to an embodiment, the first circuit is configured to transmit the input address to the bus coupled to the addressable memory space and the output address corresponds to the concatenation of the input address with the portion of the output address supplied by the connection circuit.

According to an embodiment, the memory space comprising the first address range is implemented by an internal memory of the device.

An embodiment provides a method comprising: transmitting, by a first circuit of a device, of an input address, to a connection circuit of the device, the connection circuit coupling the first circuit to a bus configured to provide access to an addressable memory space of the device, the input address corresponding to an address in a first address range or in a second address range of an addressable memory space, the addressable memory space further comprising a third address range, not addressable by the first circuit; comparing by the connection circuit of the input address with a threshold address; based on the comparison, generating, by the connection circuit, of a portion of an output address, the output address belonging to the second address range or to the third address range of the addressable memory space; and supplying the portion of the output address to the bus.

According to an embodiment, the method further comprises: transmitting, by the first circuit, of the input address to the bus coupled to the addressable memory space, the output address corresponding to the concatenation of the input address with the portion of the output address supplied by the connection circuit.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which:

FIG. 1 is a block diagram of an electronic device;

FIG. 2 illustrates an example of a memory space addressable by a 32-bit peripheral circuit;

FIG. 3 illustrates an example of a memory space addressable by a 64-bit processor;

DETAILED DESCRIPTION

Figure 4:
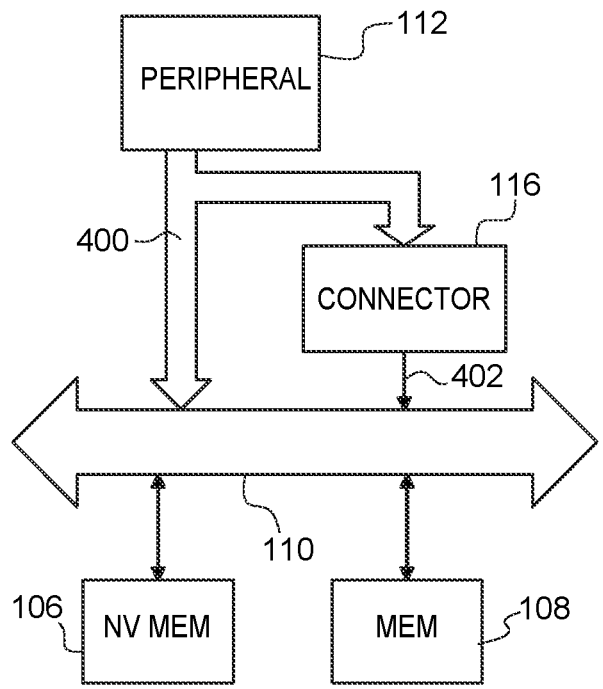
FIG. 4 is a block diagram illustrating a connection circuit coupling a peripheral circuit to an addressable memory space.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

FIG. 1 is a block diagram of an electronic device 100 comprising a processing circuit 102.

Electronic device 100 is, for example, an electronic card such as a microcircuit card, computer hardware, a microprocessor circuit, etc.

Processing device 102 comprises, for example, a processor 104 (CPU) coupled to memories 106 (NV MEM) and 108 (MEM) via a bus 110. As an example, memory 106 is a non-volatile memory, for example an internal memory of the device. Memory 108 is a volatile memory, for example of DDR SDRAM ("Double Data Rate Synchronous Dynamic Random Access Memory") type. In another example, memory 106 is a Flash-type memory coupled via a connector to bus 110.

Processing unit 102 comprises, for example, a peripheral circuit 112 (PERIPH). As an example, peripheral circuit is a graphic card, a communication interface, or another type of circuit capable of accessing at least a portion of the memory space defined by the memories of the device. According to an embodiment, peripheral circuit 112 does not have access to the entire addressable memory space formed by memories 106 and 108. As an example, peripheral circuit 112 is configured to manipulate words having a smaller length than the words manipulated by processor 104, and thus to generate addresses which are also of smaller length than the addresses generated by processor 104. The addressable memory space formed by memories 106 and 108 is, for example, sized according to the addressing capacities of processor 104, and is then not fully addressable directly by peripheral circuit 112. As an example, an address range of the memory space is not directly addressable by peripheral circuit 112. In another example, the size of the words manipulated by peripheral circuit 112 is, for example, adapted, by processor 104, to be supported by memories 106 and 108. However, an area of the addressable memory space remains inaccessible for peripheral circuit 112. As an example, the memory area inaccessible by peripheral circuit 112 is a memory area comprised in memory 108.

In an example, processor 104 is, for example, a 64-bit processor, configured to manipulate words having a size ranging up to 64 bits. As an example, the memory space formed by memories 106 and 108 has a size greater than 4 Gigabytes, for example 6 Gigabytes. As an example, memory 106 has a 2-Gigabyte size and memory 108 has a 4-Gigabyte size.

Processor 104 is, for example, capable of addressing the entire addressable memory space corresponding to memories 106 and 108. Peripheral circuit 112 is, for example, a 32-bit address peripheral. As an example, a portion of memory 108 is not addressable by peripheral circuit 112.

Processing unit 102 comprises, for example, additionally or in place of peripheral circuit 112, a direct memory access circuit 114 (DMA). As an example, direct memory access circuit 114 is a 32-bit circuit, and this circuit thus has the same limitations in terms of addressing capacities as peripheral circuit 112.

According to an embodiment, peripheral circuit 112 is coupled to bus 110 via a connection circuit 116 and/or direct memory access circuit 114 is coupled to bus 110 via a connection circuit 118.

According to an embodiment, connection circuit 116 is configured to generate an output address based on an input address supplied by peripheral circuit 112, and to supply it to bus 110. Similarly, connection circuit 118 is configured to generate an output address based on an input address supplied by direct memory access circuit 114, and to supply it to bus 110. As an example, the input addresses supplied by circuits 112 and 114 are addresses over 32 bits, and the output address is an address over 33 bits. In certain cases, connection circuits 116 and 118 are configured to only generate the most significant bit(s), for example the $33^{rd}$ bit, of the output address.

FIG. 2 illustrates an example of a memory space directly addressable by peripheral circuit 112 and/or direct memory access circuit 114. As an example, peripheral circuit 112 and/or direct memory access circuit 114 are 32-bit circuits.

As an example, memory 106 is addressable via the addresses having hexadecimal values from 0x00000000 to the neighboring value smaller than 0x80000000 and memory 108 comprises an area 200 (LOW DRR) which is addressable via the addresses having hexadecimal values from 0x80000000 to the neighboring value smaller than 0x100000000. Memory 106 is then, for example, a memory of 2-Gigabyte size and memory area 200 is also a memory of 2-Gigabyte size. Peripheral circuit 112 and/or direct memory access circuit 114 is then capable of accessing the 4 Gigabytes formed by memory 106 and memory area 200.

The address ranges defining memory area 106 as well as memory area 200 are given as an example and are of course not limiting, neither by their size, nor by their values.

FIG. 3 illustrates an example of a memory space addressable by processor 104. As an example, processor 104 is a 64-bit processor.

As an example, the memory space addressable by processor 104 comprises the address ranges associated with memory 106. As an example, as described in relation with FIG. 2, memory 106 is addressable via the addresses having a hexadecimal value between 0x00000000 and the neighboring value lower than 0x80000000. The memory space addressable by processor 104 further comprises the address ranges associated with area 200 of memory 108. As an example, as described in relation with FIG. 2, memory 106 is addressable via the addresses having a hexadecimal value between 0x80000000 and the neighboring value smaller than 0x100000000.

As an example, memory 108 further comprises an area 300 (HIGH DDR). As an example, area 300 is addressable via the addresses having a hexadecimal value between 0x100000000 and the neighboring value smaller than 1x180000000. Area 300 is, for example, addressable by processor 104 and is not directly addressable by peripheral circuit 112 and/or by direct memory access circuit 114.

FIG. 4 is a block diagram illustrating a portion of the device 100 of FIG. 1, and in particular the connection circuit 116 coupling peripheral circuit 112 to the addressable memory space associated with memories 106 and 108.

As an example, peripheral circuit 112 is a 32-bits circuit. As an example, the addressable memory space comprises the address ranges described in relation with FIG. 3. Area 300 of memory 108 is then not directly entirely addressable by peripheral circuit 112.

According to an embodiment, peripheral circuit 112 is coupled to connection circuit 116 and to bus 110 via a bus 400. For example, peripheral circuit 112 supplies, via bus 400, same addresses to connection circuit 116 and to bus 110. Connection circuit 116 is then coupled to bus 110 via a bus 402.

The buses 400 and 110 illustrated in FIG. 4 are, for example, address buses used to communicate addresses of access to memories 106, 108 during accesses, for example of write and/or read type. Although they are not illustrated in the drawings, data buses are also present between peripheral circuit 112 and the memories, enabling to communicate data to be written during write accesses, and/or enabling to communicate read data during read accesses.

According to an embodiment, processor 104 is configured to activate, or to deactivate, connection circuit 116 during a boot phase. As an example, an instruction of software executed by processor 104 causes the activation of connection circuit 116 according to the memory to which the software is configured to access. For example, during the booting of processing unit 102, peripheral circuit 112 is capable of accessing the addresses associated with memory 106 and connection circuit 116 is, for example, deactivated. As an example, once the booting of circuit 104 is over, an instruction of the software allows the activation of connection circuit 116 and peripheral circuit 112, for example, no longer has access to memory 106. As an example, when the boot sequence is over, the access to memory 106 is, for example, no longer useful. When, for example, software executed by processor 104 is configured to access a memory space having a greater size than the space associated with area 200, an instruction of the software allows the activation of connection circuit 116. Thus, for example, peripheral circuit 112 has access to the entire memory 108.

According to an embodiment, when connection circuit 116 is deactivated, it supplies, for example, no output bit over bus 402. In another embodiment, when connection circuit 116 is deactivated, it only supplies, for example, one or a plurality of output bits of a first binary value (binary value "0") over bus 402. Peripheral circuit 112, for example, directly transmits to bus 110 one or a plurality of addresses. The address(es) then belong to the address ranges associated with memory 106 or with the memory area 200 of memory 108. As an example, the address(es) transmitted by peripheral circuit 112 are coded over 32 bits. Area 300 of memory 108 then is not accessible by peripheral circuit 112 when connection circuit 116 is deactivated.

Thus, the addresses programmed by processor 104 are not recalculated. Indeed, processor 104 always gives the order to peripheral circuit 112 to access an address belonging, for example, to memory 106 or to area 200. The translation of the address is performed by connection circuit 116 and not by processor 112.

According to an embodiment, when connection circuit 116 is activated, peripheral circuit 112 transmits an input address to connection circuit 116. Connection circuit 116 is then configured to verify whether the address is, for example, greater than a threshold address. As an example, connection circuit 116 verifies whether the address is greater than 0x80000000, which corresponds, in the example described in relation with FIG. 3, to verifying whether the address transmitted by peripheral circuit 112 is an address of area 106 or of area 200. In another example, connection circuit 116 is configured to determine whether the address belongs to an address range associated, for example, with an area of memory 106 or of memory 108. According to an embodiment, connection circuit 116 is configured to generate one or a plurality of bits, for example the most significant bits of an output address based on the comparison.

As an example, if the input address delivered by peripheral circuit 112 is greater than the threshold address, for example equal to or greater than 0x80000000, connection circuit 116 is configured to deliver no output bit over bus 402, or to only deliver one or a plurality of output bits of the first binary value (binary value "0") over bus 402. The address of the memory access, which will be called "output address" in the present disclosure, which is the combination of the addresses supplied by bus 402 and by bus 400, to execute an access to the memory, is thus equal to the input address supplied by peripheral circuit 112 over bus 400. In the example described in relation with FIG. 3, if the input address delivered by peripheral circuit 112 is greater than the threshold address, it belongs to area 200, and in this case, nothing is modified and peripheral circuit 112 effectively accesses area 200 as required.

As an example, when processor 104 gives the order to peripheral circuit 112 to access memory 106, for example by indicating an address associated with the address range associated with memory 106, and connection circuit 116 is activated, then peripheral circuit 112 accesses area 300, although the ordered address belongs to the address range defining memory 106.

As an example, if the input address supplied by peripheral circuit 112 is smaller than the threshold address, for example smaller than 0x80000000, the output address supplied to bus 110 is a new address, partly supplied by connection circuit 116. For example, in this case, the output address, supplied to bus 110, is an output address for example belonging to area 300 of memory 108. For example, the output address is formed of the input address supplied over bus 400, and a portion supplied by connection circuit 116. This portion comprises, for example, one or a plurality of additional address bits, which are, for example, the most significant bit(s) of the output address. As an example, the 32 least significant bits of the output address generated by connection circuit 116 correspond to the 32 bits of the input address and the connection circuit further generates a $33^{rd}$ bit, being the most significant bit, of a second binary value (binary value "1"). Thus, an address belonging to the address range associated with memory 106 is modified, or translated, into an address belonging to area 300.

As an example, connection circuit 116 is configured to program the $33^{rd}$ bit at the first binary value (binary value "0") when the input address belongs to the address range associated with area 200 and to program it to the second binary value (binary value "1") when the input address belongs to the address range associated with memory 106.

Figure 5:
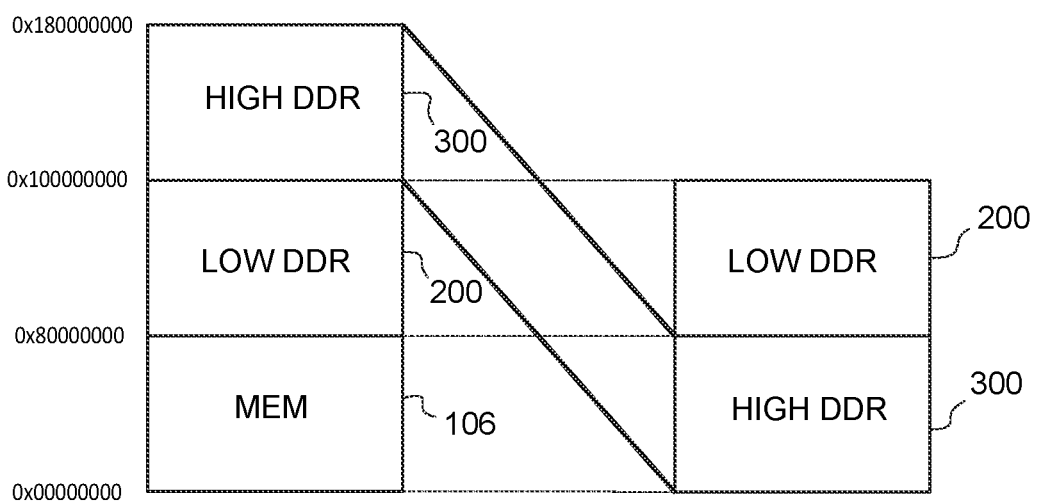
FIG. 5 illustrates an example of a memory space addressable by a 32-bit peripheral circuit.

FIG. 5 illustrates an example of the memory space addressable by peripheral circuit 112 when connection circuit 116 is activated.

As an example, connection circuit 116 is configured to program to binary value "1" a $33^{rd}$ address bit when the value of the input address, supplied by peripheral circuit 112, belongs to the address range from 0x00000000 to the neighboring address smaller than 0x80000000, for example when the input address is a memory address 106. Area 300 of memory 108 is then accessible by peripheral circuit 112. As an example, connection circuit 116 is further configured to program to binary value "0" the $33^{rd}$ bit of the output address when the input address belongs to the address range from 0x80000000 to the neighboring address smaller than 0x100000000, in other words when peripheral circuit 112 desires to access area 200. The input address is, in this case, not modified and peripheral circuit 112 accesses area 200.

Figure 6:
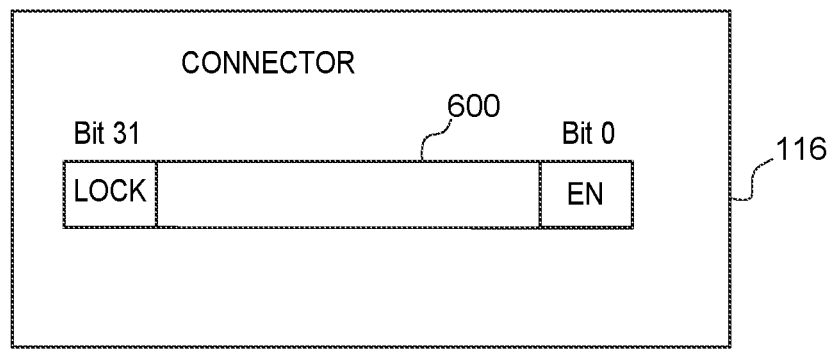
FIG. 6 is an example illustrating a register of configuration of the connection circuit.

FIG. 6 illustrates an example of a configuration register of connection circuit 116.

According to an embodiment, connection circuit 116 comprises a register 600. As an example, register 600 has a length of at least 2 bits, and in the example of FIG. 6, has a 32-bit length, comprising bits ranging from a bit 0 (Bit 0) to a bit 31 (Bit 31). As an example, bit 0 is programmable, for example by processor 104. As an example, during the booting of processor 104, processor 104 determines whether connection circuit 116 is to be activated or deactivated. As an example, the software executed by processor 104 comprises an instruction allowing the programming of bit 0 and/or of bit 31. As an example, the programming of bit 0 and/or of bit 31 is performed based on the size of memory 108 and/or on the memory function allocation performed by the software. As an example, the software comprises one or a plurality of indications of the memory area to which peripheral circuit 112 is configured to access and the programming of bit 0 and/or of bit 31 is performed based on these indications. As an example, when bit 0 (EN) of register 600 is programmed to value 1, connection circuit 116 is activated and when bit 0 is programmed to value 0, connection circuit 116 is deactivated. This programming configuration is given as an example, the programming of bit 0 to state 0 may, in another example, make connection circuit 116 active.

As an example, the bit 31 of the register is further programmable, for example by processor 104, during its booting. As an example, the state of bit 31 indicates whether the state of connection circuit 116, that is, activated or deactivated, is locked (LOCK) or not. As an example, a programming to state "1" of bit 31 implies the locking, indicated by the state of bit 0, of connection circuit 116 and a programming to state "0" indicates its unlocking. The locking state of connection circuit 116 implies, for example, that bit 0 is not reprogrammable, by processor 104. As an example, when connection circuit is locked, bit 0 is reprogrammable only during a new rebooting of processing unit 102.

Figure 7:
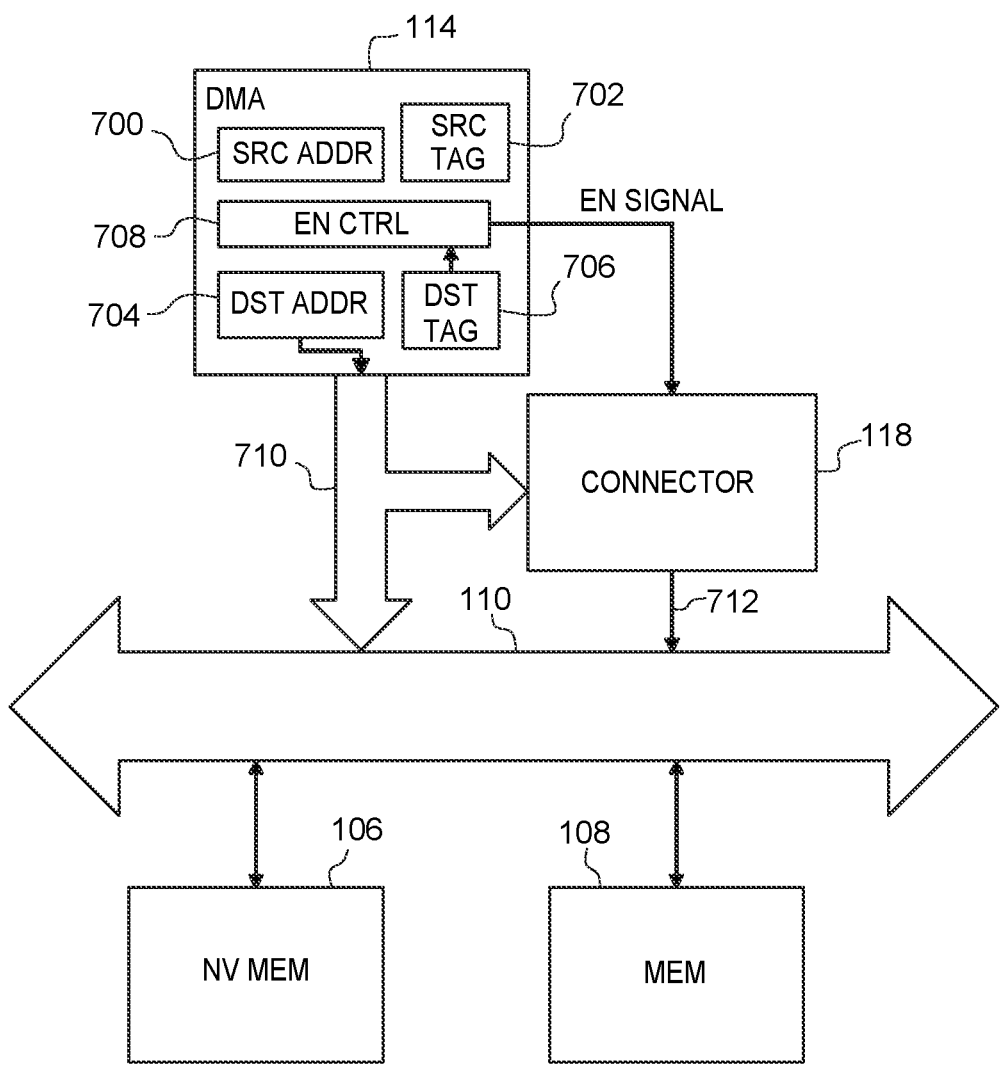
FIG. 7 is a block diagram illustrating a connection circuit coupling a direct memory access circuit to an addressable memory space.

FIG. 7 is a block diagram illustrating a portion of the device 100 of FIG. 1, and in particular the connection circuit 118 coupling direct memory access circuit 114 to the addressable memory space formed for example by memories 106 and 108.

As an example, direct memory access circuit 114 comprises registers 700 (SRC ADDR) and 702 (SRC TAG). Register 700 is, for example, configured to store, for example temporarily, a source address. As an example, source address corresponds to an address of the addressable memory space where is located a data element to which direct memory access circuit 114 is configured to access, for example in read mode. As an example, direct memory access circuit 114 is a 32-bit circuit and the source address contained in register 700 is an address over 32 bits. In the example described in relation with FIG. 3, the source address is an address belonging to the address ranges associated with memory 106 or with area 200 of memory 108. In particular, direct memory access circuit 114 is not capable of addressing area 300 of memory 108.

As an example, register 702 is configured to store an indication value, for example in the form of a data element of at least two bits. As an example, the indication value is programmed as a result of the execution of an instruction of software executed by processor 104 based on the source address and/or on the destination address. The indication value is, for example, an indication additional to the source address, identifying the memory, or the memory area, to which direct memory access circuit 114 desires to access.

Direct memory access circuit 114 further comprises registers 704 (DST ADDR) and 706 (DST TAG). As an example, register 704 is configured to store a destination address, for example coded over 32 bits. As an example, the destination address corresponds to an address of memory 106 or of memory 108 into which direct memory access circuit 114 desires, for example, to write the data element identified by the source address. As an example, register 706 is configured to store an indication value indicating to which memory area direct memory access circuit 114 is configured to access, for example in write mode.

As an example, for registers 702 and 706, a binary indication value equal to "00" indicates that direct memory access circuit 114 will access a first area of memory 106, for example reserved to storage associated with the peripheral circuit. As an example, a binary indication value equal to "01" indicates that direct memory access circuit 114 will access a second area of memory 106, for example reserved to inner storage of device 100. According to an embodiment, when the indication value indicates that direct memory access circuit 114 desires to access memory 106, connection circuit 118 is deactivated. As an example, an indication value equal to 10 indicates that the circuit of access to memory 114 desires to access memory 108.

According to an embodiment, direct memory access circuit 114 further comprises a control circuit 708 (EN CTRL) configured to activate connection circuit 118. As an example, registers 702 and 704 are coupled to control circuit 708, and control circuit 708 is configured to send a signal EN SIGNAL to connection circuit 118 when the indication value stored in register 702, or in register 706, indicates that direct memory access circuit 114 desires to access memory 108.

According to an embodiment, registers 702 and 706 are configured to transmit the source address, respectively the destination address, that they contain to bus 110, for example via a bus 710. As an example, the 32 bits forming the source address, or the destination address, are transmitted to bus 110 via bus 710.

The buses 710 and 110 illustrated in FIG. 7 are, for example, address buses used to communicate addresses of access to memories 106, 108 during accesses, for example of write and/or read type. Although they are not illustrated in the drawings, data buses are also present between circuit 114 and the memories, enabling data to be written to be communicated during write accesses, and/or enabling read data to be communicated during read accesses.

According to an embodiment, when connection circuit 118 is activated, the connection circuit is configured to compare the source address, or the destination address, with a threshold address, or with an address range. As an example, connection circuit 118 is configured to determine whether the source address, or the destination address, belongs to the address range associated with memory 106. If such is the case, connection circuit 118 is configured, for example, to program to binary value "1" a $33^{rd}$ address bit of the source address, or of the destination address. Thereby, an address belonging to memory 106 is translated to an address belonging to the area 300 of memory 108. As an example, if connection circuit 118 determines that the source address, or the destination address, belongs to the address range defining area 200 of memory 108, then connection circuit 118 is configured to program to binary value "0" the $33^{rd}$ address bit of the source address or of the destination address. Thereby, the source address, or the destination address, is not modified. As an example, connection circuit 118 is configured to transmit the value of the $33^{rd}$ address bit to bus 110 via a bus 712.

The use of the indication values, in registers 702 and 706, enables to activate and deactivate, dynamically, connection circuit 118, thus it is, for example, possible to, first, read a data element from area 200 or from memory 106, when connection circuit 118 is deactivated and, for example, write it into the area 300 of memory 108 after having activated connection circuit 118.

Figure 8:
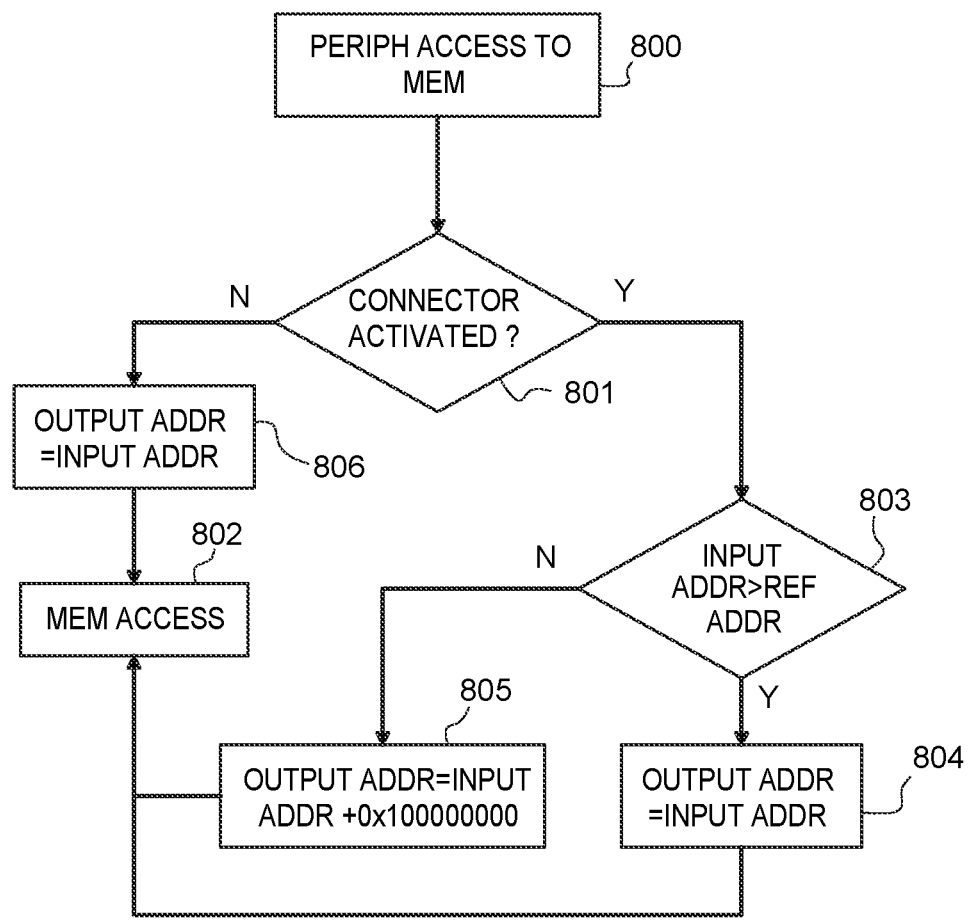
FIG. 8 is a flowchart illustrating steps of a method of access to the addressable memory space.

FIG. 8 is a flowchart describing steps of a method of access to an addressable memory space, formed for example by memories 106 and 108. As an example, the method is implemented via connection circuit 116 or 118. The addressable memory space is not, for example, entirely addressable by peripheral circuit 112 or by direct memory access circuit 114.

At a step 800 (PERIPH ACCESS TO MEM), peripheral circuit 112 or direct memory access circuit 114 initiates a request of access to the addressable memory space. As an example, the input address is an address comprised either within the address range associated with memory 106, or within that associated with area 200. In particular, peripheral circuit 112 or direct memory access circuit 114 is not capable of addressing the area 300 of memory 108.

At a step 801 (CONNECTOR ACTIVATED?), subsequent to step 800, it is verified whether connection circuit 116 or 118 is activated. As an example, during the carrying out of step 801, peripheral circuit 112 or direct memory access circuit 114 transmits the input address to bus 400 or 710.

If connection circuit 116 or 118 is deactivated (branch N), the method carries on at a step 806 (OUTPUT ADDR=INPUT ADDR). As an example, during the carrying out of step 806, an output address is generated by processor 104, for example by adapting the input address. As an example, the input address is an address over 32 bits and processor 104 converts it into an address over 33 bits. The generated output step then enables the peripheral circuit to access the desired memory address. In other words, the output address corresponds to the input address. The generated output address thus belongs, for example, to memory area 106 or 200.

After step 806, peripheral circuit 104 accesses, at a step 802 (MEM ACCESS), memory 106 or area 200 of memory 108, for example, by the output address, which is transmitted to bus 110.

If connection circuit 116 or 118 is activated (branch Y at the output of step 801), the method carries on at a step 803 (INPUT ADDR>REF ADDR?). Connection circuit 116 or 118 compares, for example, the input address, previously transmitted by peripheral circuit 112 or by direct memory access circuit 114, with a threshold address. As an example, connection circuit 116 or 118 determines whether the input address is, for example, greater than address 0x80000000, which corresponds to verifying whether the input address belongs to area 200 of memory 108. Address 0x80000000 is given as an example and is of course not limiting. Other addresses, or address ranges associated with memories 106 and 108 or without memories may of course be used.

If the input address is, for example, greater than the threshold address (branch Y), the method continues at a step 804 (OUTPUT ADDR=INPUT ADDR), where an output address supplied to bus 110 is identical to the input address. In an example, the input address, for example coded over 32 bits, is transmitted to bus 110 and connection circuit 116 or 118 programs, for example, a $33^{rd}$ bit to zero, that it supplies to bus 110. Thus, the output address is identical to the input address.

If the input address is, for example, not greater than the threshold address (branch N), connection circuit 116, or 118, is configured to modify the input address at a step 805 (OUTPUT ADDR=INPUT ADDR+0x100000000). As an example, if the input address is smaller than the threshold address, this means that the input address belongs to memory 106. As an example, the modification of the address consists of a translation to an address belonging to area 300. As an example, the 32 least significant bits of the output address are identical to the 32 bits of the input address and connection circuit 116 or 118 programs a $33^{rd}$ bit, such as the most significant bit of the output address, to binary value "1". The output address, corresponding to the concatenation of the input address with the portion of the output address supplied by connection circuit 116 or 118, is then supplied to bus 110. Thus, the output address for example corresponds to an address of area 300.

As a result of the carrying out of step 804 or of step 805, the method ends in an implementation of step 802, where peripheral circuit 112 or direct memory access circuit 114 accesses the input address in the addressable memory space.

An advantage of the described embodiments is that they enable a peripheral circuit, or another circuit, to access memory areas that they cannot directly access.

Another advantage of the described embodiments is that they enable a peripheral circuit to extend its capacities. As an example, a peripheral circuit configured to generate addresses over 32 bits has the capacity of addressing a memory having at least part of its addresses over 33 bits.

Another advantage of the described embodiments is that they do not require any configuration of the peripheral circuits. Thus, any peripheral circuit coupled to the connection circuit benefits from the advantages provided by the connection circuit.

Another advantage of the described embodiments is that the processor does not have to be reprogrammed. Indeed, the addresses ordered by the processor do not have to be recalculated, for example via a translation table.

Various embodiments and variants have been described. Those skilled in the art will understand that certain features of these various embodiments and variants may be combined, and other variants will occur to those skilled in the art. In particular, the size of the addressable memory may vary and the thus the address ranges defining the different memories and/or memory areas may vary. Similarly, the indication values stored in association with the source or destination addresses in the direct memory access circuit may vary.

Finally, the practical implementation of the described embodiments and variants is within the abilities of those skilled in the art based on the functional indications given hereabove.

The invention claimed is:

1. A connection circuit configured to couple a first circuit of a device to a bus configured to provide access to an addressable memory space of the device, wherein the connection circuit is configured to:
   receive an input address from the first circuit, wherein the input address corresponds to an address in one of a first address range of the addressable memory space or a second address range of the addressable memory space, the addressable memory space further comprising a third address range which is not addressable by the first circuit;
   compare the input address with a threshold address;
   in response to the comparison, generate an address portion; and
   supply an output address to the bus, wherein the output address is a combination of the input address and the address portion, and wherein the output address belongs to one of the second address range of the addressable memory space or the third address range of the addressable memory space.

2. The connection circuit according to claim 1, wherein the address portion comprises one or more additional address bits, and the connection circuit is configured to supply said one or more additional address bits to the bus as most significant bits of the output address.

3. The connection circuit according to claim 2, further configured to:
   when the input address belongs to the second address range, generate the one or more additional address bits as most significant bits of the output address having a binary value "0" concatenated to the input address; and
   when the input address belongs to the first address range, generate the one or more additional address bits as most significant bits of the output address having a binary value "1" concatenated to the input address.

4. A device, comprising:
   one or more memory circuits defining an addressable memory space comprising a first address range, a second address range, and a third address range;
   a first circuit which is not capable of generating an address forming part of the third address range;
   a connection circuit coupling the first circuit to the addressable memory space and configured to:
      receive an input address from the first circuit, wherein the input address corresponds to an address in one of the first address range of the addressable memory space or the second address range of the addressable memory space;
      compare the input address with a threshold address;
      in response to the comparison, generate an address portion; and
      supply an output address to the bus, wherein the output address is a combination of the input address and the address portion, and wherein the output address belongs to one of the second address range of the addressable memory space or the third address range of the addressable memory space.

5. The device according to claim 4, further comprising a processor, wherein the connection circuit further comprises a register, programmable by the processor, wherein the register is configured to store a first bit having a value defining whether the connection circuit is in one of a first state or a second state, the second state being a state where the connection circuit is deactivated.

6. The device according to claim 4, wherein the combination corresponds to a concatenation of the input address with the address portion supplied by the connection circuit.

7. The device according to claim 4, wherein the memory space comprising the first address range is implemented by an internal memory of the device.

8. The device according to claim 5, wherein the register is configured to store a second bit, programmable by the processor and wherein the programming of the second bit implements locking the state of the connection circuit at the state defined by the value of the first bit.

9. The device according to claim 5, wherein the processor is a 64-bit processor and the first circuit is a 32-bit peripheral circuit.

10. The device according to claim 5, wherein the memory space comprising the second address range and third address range is implemented by a volatile memory, the third address range being addressable by the processor.

11. The device according to claim 5, wherein the first circuit is a peripheral circuit of the device.

12. The device according to claim 5, wherein the first circuit is a direct memory access circuit configured to send, based on the content of a register, an activation signal to the connection circuit, the activation signal programming the connection circuit in the first state.

13. A method, comprising:
   transmitting, by a first circuit of a device, an input address to a connection circuit of the device, the connection circuit coupling the first circuit to a bus configured to provide access to an addressable memory space of the device, the input address corresponding to an address in one of a first address range of the addressable memory space or a second address range of an addressable memory space, the addressable memory space further comprising a third address range that is not addressable by the first circuit;
   comparing by the connection circuit of the input address with a threshold address;
   in response to the comparison, generating, by the connection circuit, an address portion;
   supplying an output address to the bus, wherein the output address is a combination of the input address and the address portion, wherein the output address belongs to one of the second address range of the addressable memory space or the third address range of the addressable memory space.

14. The method according to claim 13, wherein the combination corresponds to a concatenation of the input address with the address portion supplied by the connection circuit.

* * * * *